THOMAS McQUISTON.
Improvement in Cultivators.
No. 4,383. Reissued May 16, 1871.
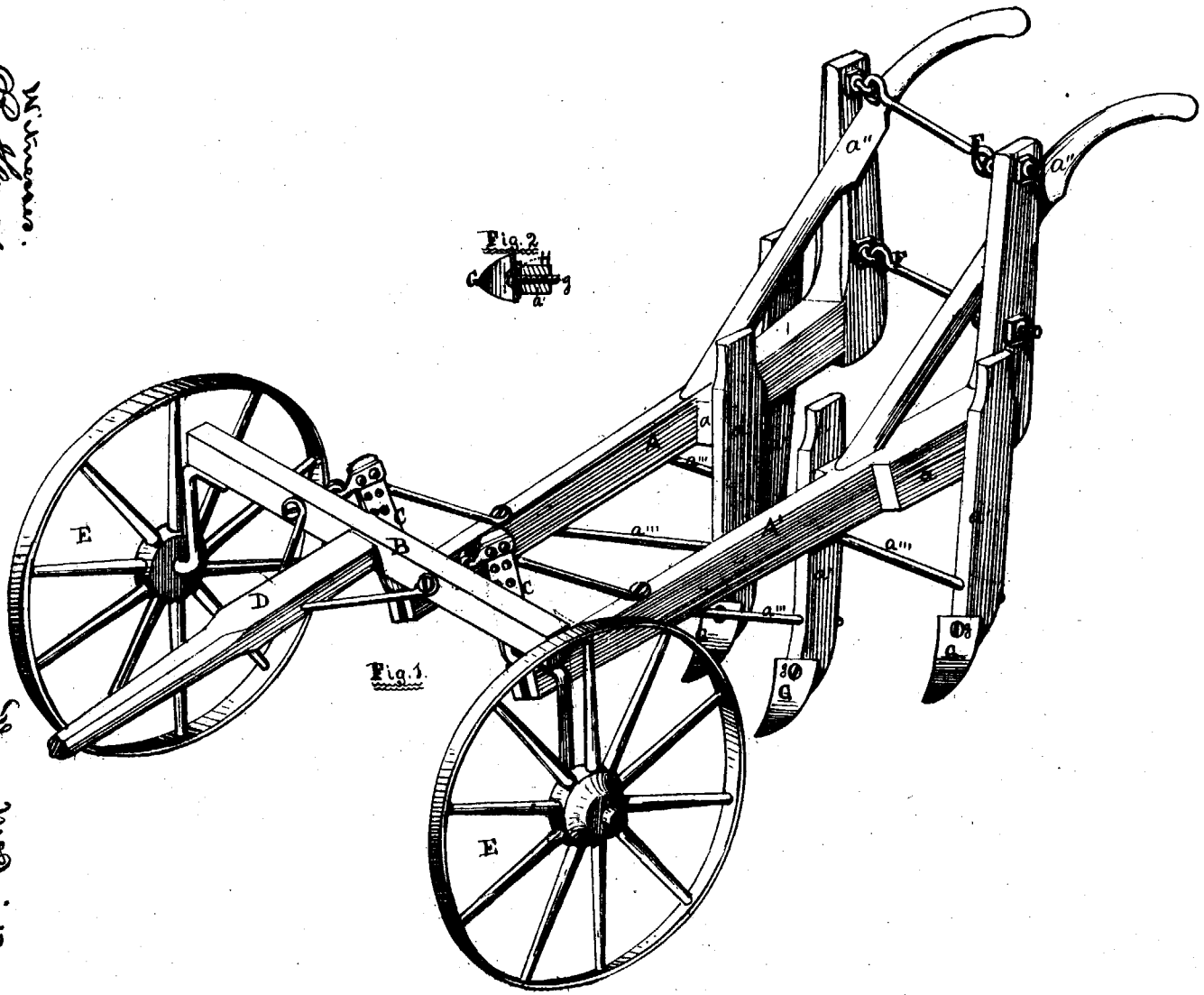
Witnesses.
C. L. Hanna
M. Wright
Thomas McQuiston
by W. B. Richards & A. McCallum
Attys.
AM. PHOTO-LITHOGRAPHIC CO. N.Y. (OSBORNE'S PROCESS.)

UNITED STATES PATENT OFFICE.

THOMAS McQUISTON, OF MORNING SUN, OHIO.

IMPROVEMENT IN CULTIVATORS.

Specification forming part of Letters Patent No. 25,843, dated October 18, 1859; reissue No. 4,383, dated May 16, 1871.

I, THOMAS McQUISTON, of Morning Sun, Preble county and State of Ohio, have invented certain Improvements in Cultivators, of which the following is a specification:

*Nature and Object of the Invention.*

My invention relates to improvements in that class of machines known as straddle-row cultivators—that is to say, cultivators intended to till or cultivate the soil on both sides of a row of plants at the same time; and the invention consists in a peculiar combination of two wheels, an axle, and a tongue or pole with two plow-beams, each carrying a handle and one or more shovels or plows arranged in two gangs, with a central space between the gangs for the passage of the row of plants to be cultivated, and independently connected at their forward ends to the axle in such manner as to allow each beam, with its plow or gangs of plows, to be raised and lowered or moved from side to side by the handle. It also consists in connecting the plow-beams directly to the axle by means of an adjustable connection, whereby the relative depth of penetration of the plows may be regulated; and it further consists in providing a means for altering the inclination of the plows or cultivator-teeth transversely to the line of progress of the machine, so as to throw the soil toward or from the plants, as desired.

In the accompanying drawing, Figure 1 is a perspective view of an implement illustrating my invention. Fig. 2 is a horizontal section through a standard and share or cultivator-tooth, showing the means by which the latter is made to throw the soil in either direction.

A A′ are two plow-beams, having shoulders or projections *a* on their rear ends, to which are secured, on either side and at a convenient distance apart, share stocks or standards, *a′*. Each plow-beam is also provided with a handle, *a″*, rigidly secured thereto. The standards are further secured to the plow-beams by brace-rods *a‴*. The forward end of each plow-beam is jointed to an axle, B, by means of an adjustable bracket or elbow, C. The central portion of the axle is elevated sufficiently high to permit it to pass over the growing crop without injury to the plants, while its ends are bent downward and outward, so as to permit of the use of smaller wheels than would otherwise be necessary. D is the tongue or draft-pole, secured to the middle of the axle. E E are the wheels. F F represent connecting-links for loosely attaching the rear ends of the plow-beams to each other, by means of eyebolts secured in the uprights on the ends of the beams by nuts. G are the shares or cultivator-teeth, secured to the standards *a′* by screw-bolts *g*, reversible wedge-shaped plates H being inserted between the shares and standards, as shown by Fig. 2 of the drawing, so as to incline the shares to the right or left for the purpose of throwing the soil toward or from the plants, as desired; but I do not confine myself to the particular share or cultivator-tooth shown in the drawing. Land-side plowshares or other cultivating devices may be substituted.

The operation of the machine is as follows: The horses are driven between the rows, the pole of the machine being directly above and in a line with the row of plants to be cultivated. This brings the plow-beams one on each side of the row. Now, the plow-beams being independently attached to the axle at their forward ends, and the handles rigidly attached to the beams, they thereby form independent levers, the axle being the fulcrum, for the purpose of enabling the driver to raise or lower the shares or cultivators, and lift them clear over any obstacle that may be in the line of progress, and also to direct them laterally—that is, to or from the rows—so as to avoid plowing out such irregular plants as may have germinated slightly out of the line of the row. The cultivator-teeth or shares G are adjusted to throw the soil to or from the plants by reversing the wedge-shaped plates H.

What I claim as my invention is—

1. The combination, in a walking straddle-row cultivator, of the following instrumentalities, viz: Two wheels, E, tongue D, axle B, and two plow-beams, A A, each beam carrying a handle, and one or more shovels or plows, and independently connected or hinged by brackets C to the axle, so as to permit of their being raised or lowered independently or moved laterally by the handle, as set forth.

2. The combination, in a walking straddle-row cultivator, of the following instrumentalities, viz: Two wheels, E, tongue D, axle B, two plow-beams, hinged as aforesaid, and rear connecting shackles or links F, all operating in combination, substantially as and for the purpose set forth.

3. The plates H, interposed between the shares G and standards $a'$, for the purpose set forth.

Witnesses: THOS. McQUISTON.
JAS. R. H. BERNARD,
M. I. BERNARD.